June 21, 1932. C. T. MORSE ET AL 1,863,578
APPARATUS AND METHOD OF AIR CONDITIONING
Filed Nov. 22, 1929   3 Sheets-Sheet 2

INVENTORS
Clark T. Morse
BY Edward L. Hogan
Toulmin & Toulmin
ATTORNEY

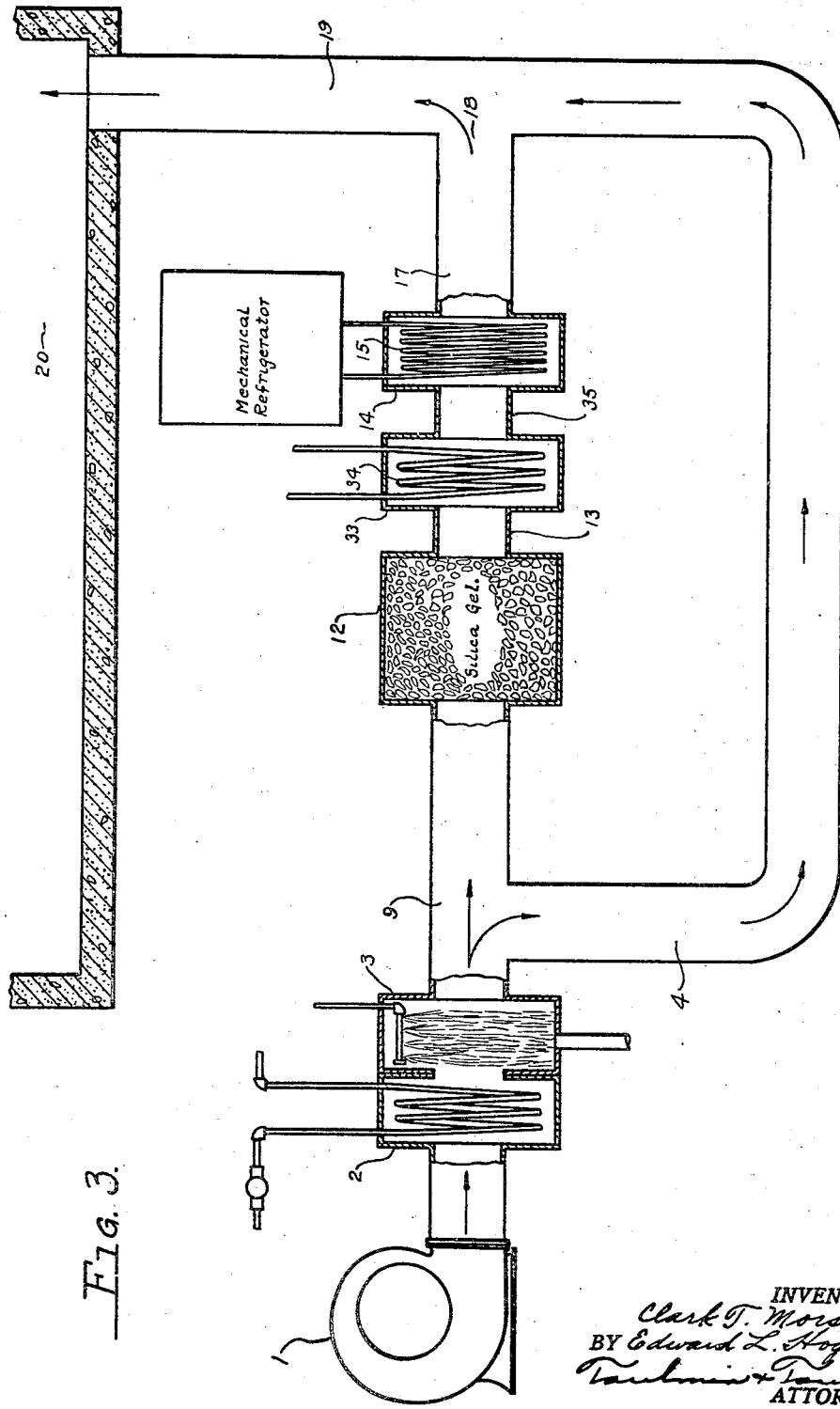

Patented June 21, 1932

1,863,578

UNITED STATES PATENT OFFICE

CLARK T. MORSE AND EDWARD L. HOGAN, OF DETROIT, MICHIGAN, ASSIGNORS TO AMERICAN BLOWER CORPORATION, OF DETROIT, MICHIGAN, A CORPORATION OF DELAWARE

APPARATUS AND METHOD OF AIR CONDITIONING

Application filed November 22, 1929. Serial No. 408,955.

Our invention relates to a method and apparatus for controlling the temperature and humidity of air.

It is the object of our invention to bring to a predetermined standard of humidity and temperature a body of air, dividing said air stream so standardized into two streams, standardizing one of said streams by cooling or air washing and as to the other stream precooling it, dehumidifying it and again cooling it to reduce the temperature rise by reason of the dehumidification.

Referring to the drawings,

Figure 3 is a diagrammatic view, partially in section, of the system for treating air in which all the air is partially treated and a part thereof is by-passed and not further treated while the unby-passed air is further treated.

Figure 1:
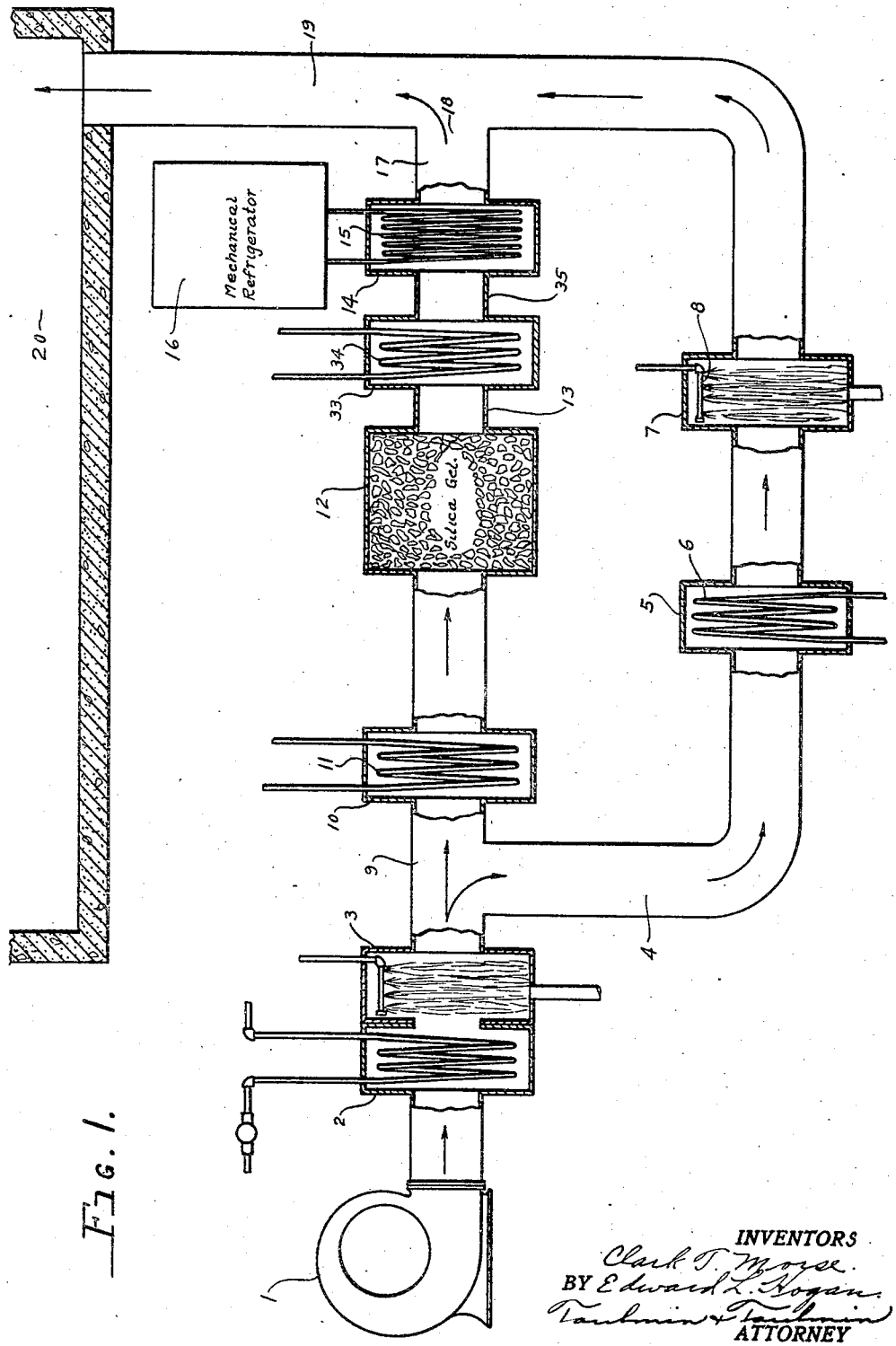
Figure 1 is a diagrammatic view of one arrangement of our invention.

Referring to the drawings in detail, 1 is a source of fresh air which passes through a cooler 2 in which the temperature of the air is reduced. A washer 3 may also be employed or may be employed by itself for adjusting the incoming humidity of the air. This standardized body of air is diverted into two streams. One stream passes through the pipe 4 and thence through the air cooler 5 over water pipes 6 and then into an air washer 7 having water sprays 8. The use of the air washer is optional. If the washer 3 is used, it may not be necessary to employ the washer 7. On the other hand, if no moisture is to be added to the air passing through the by-pass line 9 and it is desired to add moisture to the air passing through the pipe 4 then the air washer 7 can be employed.

In the line 9 is a precooler 10 having 70 degree water coils over which the air passes and is cooled. It then passes into the silica gel container 12 where its temperature rises and its humidity is materially lowered so that a relatively high temperature and a low dew point is secured. Thence the air passes through the pipe 13 over the final cooler 14 having the refrigerating coils 15 from a source of mechanical refrigeration 16. This series of coils may be water coils if desired. In either instance, the dry air is not affected by the cooling as the dry air does not come in contact with water.

Figure 2:
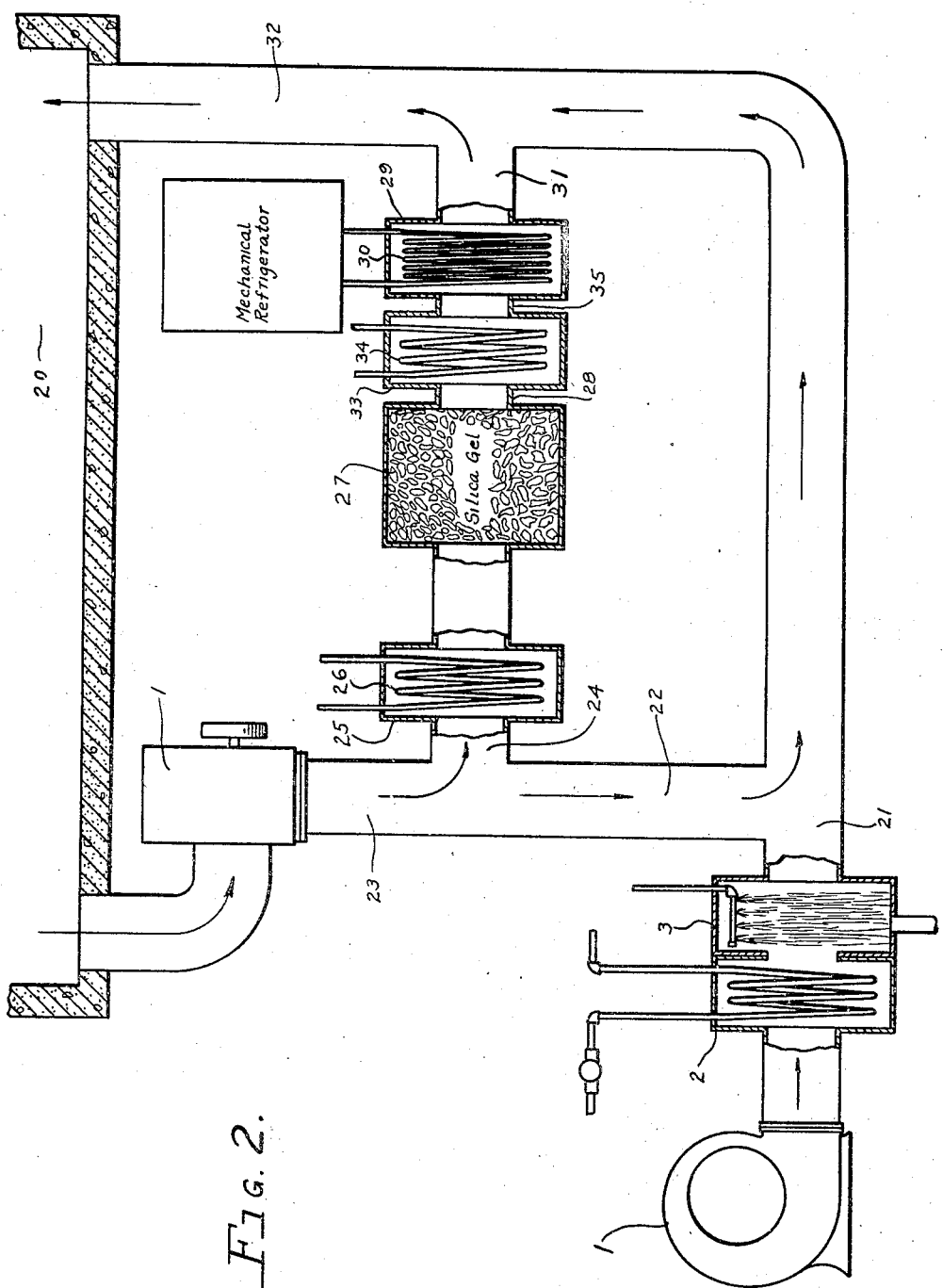
Figure 2 is a diagrammatic view of another arrangement of our invention in which a recirculation from an enclosure is precooled, dehumidified and cooled and then introduced into the main body of fresh air as a part of the air supplied for the enclosure.

The dry and cool air passes out of the cooler 14 through the pipe 17 where it joins the pipe 4 at 18 and thence passes through the pipe 19 in a condition of temperature and humidity which is a result of the combination of the two streams of air. Thence it passes into the enclosure 20. Referring to Figure 2 where similar numerals indicate similar parts, the incoming air, after having been cooled, passes through the pipe 21 which joins the pipe 22 that carries a part of the return air from the pipe 23 and the enclosure 20. The other part of this return air passes through the pipe 24, the cooler 25 having water coils 26, the silica gel bed 27, the pipe 28, the mechanical refrigeration cooler 29 having coils 30, thence through the pipe 31 where this by-pass line rejoins the main air stream and the part of the re-circulation stream and proceeds by the pipe 32 to the enclosure 20.

It will be understood that we desire to comprehend within our invention such modifications as may be necessary to adapt it to varying conditions and uses.

Having thus fully described our invention, what we claim as new and desire to secure by Letters Patent, is:—

1. In a method of air conditioning, precooling an air stream, dividing said stream, cooling a portion of the divided stream, precooling the other portion of the divided stream, then dehumidifying the last portion and again cooling the dehumidified portion and reconsolidating the streams.

2. In a method of air conditioning, precooling an air stream, dividing the stream, cooling one portion of the stream, cooling the other portion of the stream, dehumidifying the last portion of the stream and again cooling at a lower temperature said portion of the stream and reconsolidating said streams.

3. In a method of air conditioning, passing incoming air in contact with water to adjust its humidity, dividing the air stream, cooling one part of the stream, cooling the other part of the stream, dehumidifying the last part and reconsolidating the streams.

4. In a method of air conditioning, passing incoming air in contact with water to adjust its humidity, dividing the air stream, cooling one part of the stream, cooling the other part of the stream, dehumidifying the last part and again cooling the dehumidified air.

5. In a method of air conditioning, passing incoming air in contact with water to adjust its humidity, dividing the air stream, cooling one part of the stream, cooling the other part of the stream, dehumidifying the last part and again cooling the dehumidified air at a lower temperature than the first cooling prior to dehumidification.

6. In a method of air conditioning, standardizing the stream to a predetermined temperature and state of humidity, dividing the stream, cooling one part thereof, cooling the other part thereof, dehumidifying one of said parts and reconsolidating said streams.

7. In a method of air conditioning, standardizing the temperature and moisture content of the air stream, separating the stream into two parts, cooling one part and increasing the moisture content of said part; cooling the other part, dehumidifying it, again cooling it and reconsolidating said streams.

8. In an air conditioning system, a main line pipe having a fan, a cooler and an air washer therein, a by-pass pipe, a cooler in the by-pass, an air washer in the by-pass, a cooler, a silica gel dehumidifier and a mechanically refrigerated cooler in the main line pipe beyond the by-pass and a common line beyond the juncture of the by-pass and the main line for conveying the mingled contents of the two lines to an enclosure.

In testimony whereof, we affix our signatures.

CLARK T. MORSE.
EDWARD L. HOGAN.